Sept. 4, 1945. J. A. JENSEN 2,384,308
SWING JOINT
Filed Oct. 12, 1943 2 Sheets-Sheet 2
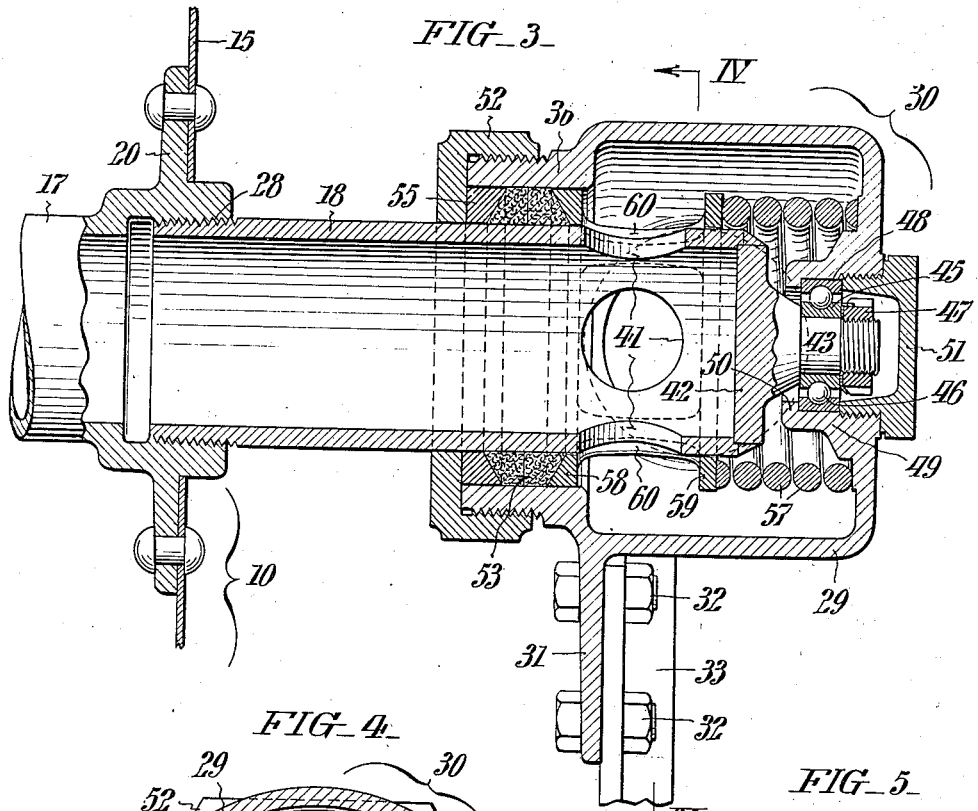
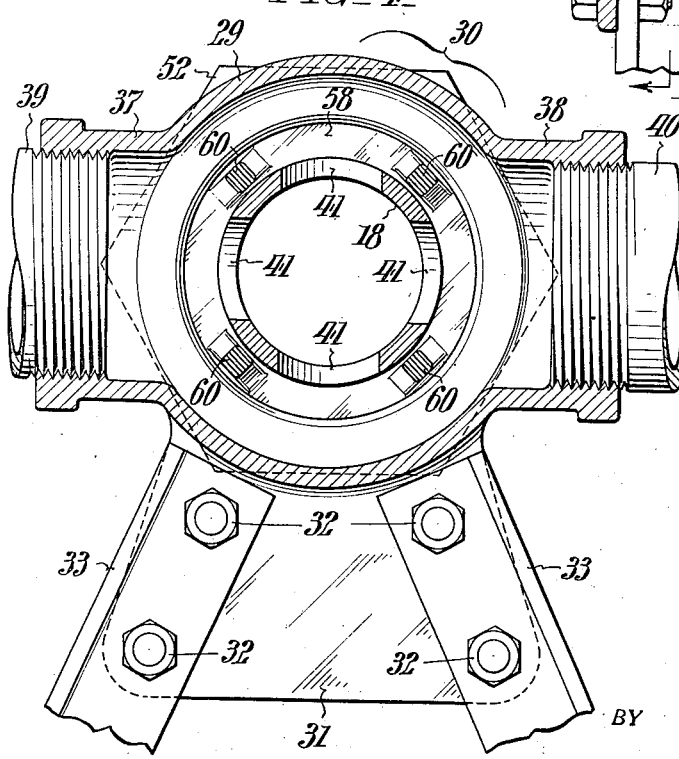
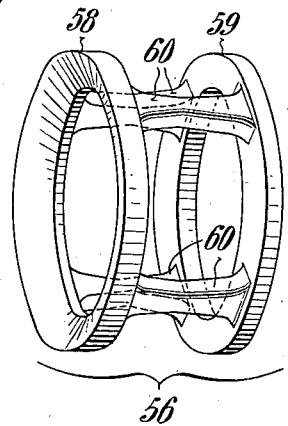
INVENTOR:
James A. Jensen,
BY
ATTORNEYS.

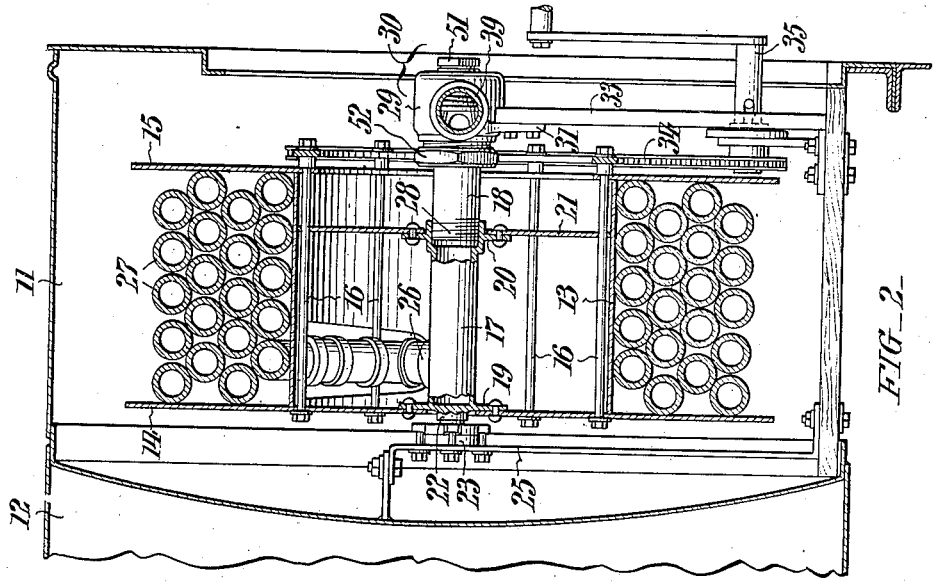
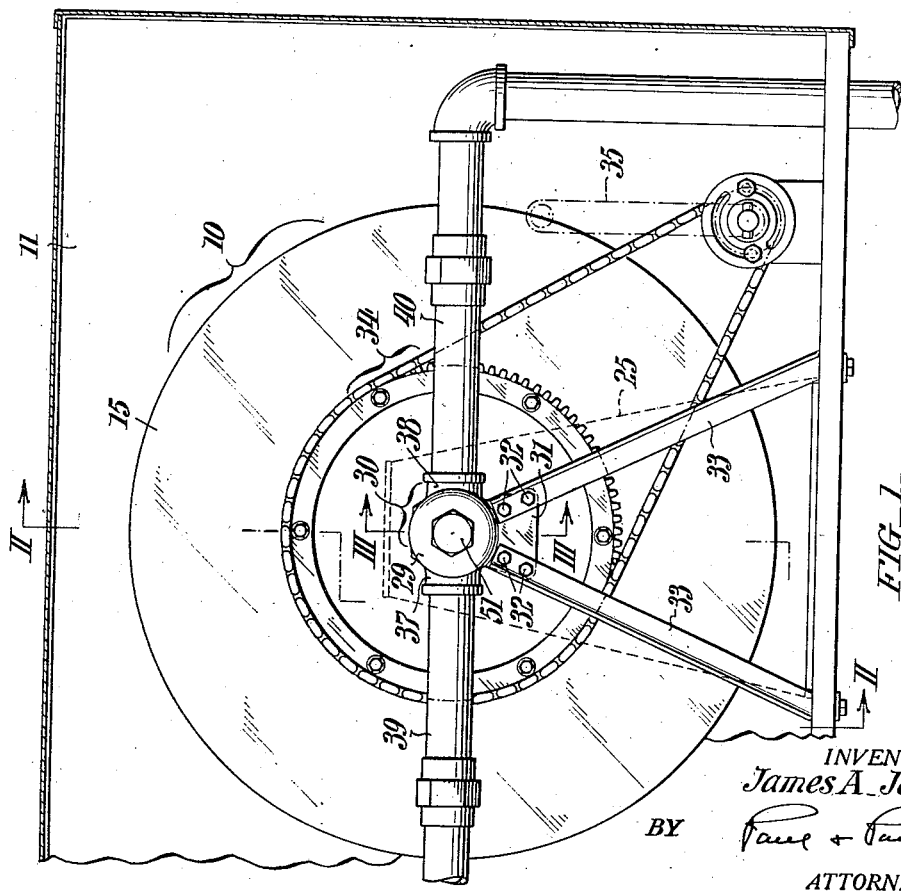

Patented Sept. 4, 1945

2,384,308

UNITED STATES PATENT OFFICE 2,384,308

SWING JOINT

James A. Jensen, Philadelphia, Pa., assignor to Philadelphia Valve Company, Philadelphia, Pa., a co-partnership Application October 12, 1943, Serial No. 505,903

2 Claims. (Cl. 285—96.3)

This invention relates to swing joints, that is to say to joints for rotatively coupling two liquid conducting pipes at an angle to each other. Such joints are useful for example in hose reel structures having tubular shafts of piping to which the hoses are connected and which communicate, by way of the joints, with stationary pipes at right angles to the reel shafts. A joint of this general character is disclosed in U. S. Patent No. 1,992,750, granted to me on February 26, 1935.

My present invention may be regarded as an improvement on the swing joint of the above patent, having for its chief aims the automatic maintenance of the packing in fluid-tight compression at all times and thereby obviating the necessity for frequent adjustments to compensate for wear; and the improvement of such joint otherwise with a view toward lowering manufacturing costs and toward facilitating assembling or disassembling of their component parts.

Other objects and attendant advantages will appear from the following detailed description of of the attached drawings wherein, Fig. 1 is a view in side elevation of a hose reel structure of the type ordinarily used on oil or gasoline delivery trucks, with an incorporated swing joint conveniently embodying the present improvements.

Fig. 2 is a cross section taken as indicated by the angled arrows II—II in Fig. 1, with the tubular shaft of the reel illustrated for the most part in elevation.

Fig. 3 is a detail view on a larger scale taken as indicated by the angled arrows III—III in Fig. 2 and showing the swing joint in axial section.

Fig. 4 is a cross section of the joint taken as indicated by the angled arrows IV—IV in Fig. 3; and Fig. 5 is a perspective view of one of the component parts of the joint.

With reference more particularly first to Figs. 1 and 2, the numeral 10 comprehensively designates the hose reel which is illustrated as being enclosed in a compartment 11 afforded by the body 12 of a delivery truck. As shown the reel 10 has a hollow core 13 and circular end flange disks 14, 15 fashioned from sheet metal and united by a plurality of circumferentially arranged tie rods 16. The shaft of the reel is composed of two pipe sections 17 and 18 whereof the first has circumferential flanges 19 and 20 adjacent it ends which are riveted respectively to the disk 14 and to a diaphragm 21 within the core 13 at the reel. The outer or left-hand end of the shaft section 17 is closed and provided with a trunnion extension 22 which is journaled in a bearing 23 bolted to a fixed upright 25 of the truck body. This bearing is preferably of a ball bearing or roller type like the one disclosed in my patent hereinbefore referred to. Immediately inward of the flange 19 the shaft section 17 has a lateral outlet 26 whereto the hose 27 is connected. The inner end of the other pipe section 18 of the reel shaft is screwed into the corresponding end of the section 17 as at 28, and has its outer end journaled in a manner presently explained within the housing 29 of the swing joint 30 which constitutes the subject matter of my present invention, said housing having a pendent flange projection 31 for attachment by means of bolts 32 to a symmetrically disposed annularly arranged supporting strut 33 within the reel compartment 11. The reel 10 is rotatable by means of a sprocket chain drive means 34 provided with a detachable crank handle 35.

By reference now to Figs. 3 and 4 it will be observed that the housing 29 of my improved swing joint 30 is of cup-like configuration having a diametrically reduced axial neck portion 36 which extends over the end of the pipe 18, and a pair of aligned lateral bosses 37 and 38 for connection of flow pipes 39 and 40 extending from different tank sub-divisions (not shown) of the truck. In this connection it is to be noted that the pipe section 18 of the reel shaft has a circumferential series of ports 41 for flow communication with the interior of the housing 29. Welded or otherwise permanently secured to the shrouded end of the pipe 18 is a closure 42 with a shouldered axial trunnion projection 43 whereon the inner race 45 of a ball bearing 46 is secured by a clamp nut 47. The outer race 48 of the ball bearing 46 is lodged in the bore of an axial boss 49 which extends inwardly from the back wall of the housing 29, being clamped against a circumferential stop shoulder 50 at the inner end of said boss by a cover cap 51 which screws into the outer end of said bore. Thus the ball bearing 46 may be considered as a means for preventing relative axial movement between the housing 29 and the pipe 18. Threadedly engaging the neck 36 of the housing 29 at the entrant end of the latter is a cup nut 52 having an axial aperture slightly larger in diameter than that of the pipe 18, and surrounding the pipe 18 within said neck is a ring 53 of compressible packing which is backed by a beveled metallic follower ring 55 which bears against the cup nut 52. The means provided for yieldingly exerting constant pressure on the packing 53 for automatic maintenance of a fluid-tight seal includes a spider 56 (Fig. 5) which fits over the shrouded end of the pipe 18, and a helical spring 57 (Fig. 3) whereof one end bears directly against the inner end of the spider 56 and whereof the other end bears against the back wall of said housing 29. As shown in Fig. 5, the spider 56 is integrally formed, having end rings 58 and 59 joined at circumferential intervals by slender connecting bars 60 with provision of intervening lateral openings to correspond with the flow ports 41 in the pipe 18. It is to be particularly noted that the end ring 58 of the spider 56 is beveled counter to the backing ring 55, so that under the influence of the spring 57 the packing 53 is effectively compressed at all times.

While I have herein shown and described my improved swing joint in association with a hose reel structure of a specific kind, it is to be understood that its use is not to be considered as thus limited, since, as will be understood by those skilled in the art, by suitable modifications within the scope of the appended claims it is readily adaptable in other conduit or flow systems where two pipes must have capacity for rotary movement in relation to each other.

Having thus described my invention, I claim:

1. In a swing joint of the character described, a pipe having a closed end with a diametrically reduced axial trunnion and with a series of circumferentially arranged ports adjacent said end; a cup like housing extending, with clearance all around, over the pipe end; a bearing for the pipe trunnion in the rear end wall of the housing; packing surrounding the pipe within an annular cavity formed in the opposite end of the housing; a sleeve fitting over the pipe within the housing and having circumferentially arranged openings in the plane of the ports in said pipe; a helical spring surrounding the bearing aforesaid between the rear end wall of the housing and the sleeve to compress the packing for maintenance of a fluid tight joint; and a second pipe communicating laterally into the housing.

2. In a swing joint of the character described, a pipe having a closed end with a diametrically reduced axial trunnion and with a series of circumferentially arranged ports adjacent said end; a cup like housing extending, with clearance all around, over the pipe end; a ball bearing in which the pipe trunnion is journalled and beyond which it protrudes, located within the shouldered bore of a boss extending inwardly from the rear wall of the housing; a closure whereby the ball bearing unit is maintained against the shoulder in the bore of the boss; a collar on the protruding end of the trunnion preventing, by cooperation with the ball bearing unit, axial displacement between the pipe and the housing; a sleeve fitting over the pipe within the housing and having circumferentially arranged openings in the plane of the ports in said pipe; a helical spring surrounding the boss aforesaid between the rear end wall of the housing and the sleeve to compress the packing for maintenance of a fluid tight joint; and a second pipe communicating laterally into the housing.

JAMES A. JENSEN.